United States Patent
Nomura et al.

(10) Patent No.: US 12,187,101 B2
(45) Date of Patent: Jan. 7, 2025

(54) VEHICLE AIR CONDITIONER

(71) Applicant: DENSO CORPORATION, Kariya (JP)

(72) Inventors: Tomoyuki Nomura, Kariya (JP); Syuichi Mizuno, Kariya (JP); Hiroshi Oshitani, Kariya (JP); Takeshi Wakisaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 173 days.

(21) Appl. No.: 17/962,941

(22) Filed: Oct. 10, 2022

(65) Prior Publication Data

US 2023/0031520 A1 Feb. 2, 2023

Related U.S. Application Data

(63) Continuation of application No. PCT/JP2021/004118, filed on Feb. 4, 2021.

(30) Foreign Application Priority Data

Apr. 20, 2020 (JP) .................................. 2020-074539

(51) Int. Cl.
*B60H 1/32* (2006.01)
*B60H 1/00* (2006.01)

(52) U.S. Cl.
CPC ....... *B60H 1/3205* (2013.01); *B60H 1/00878* (2013.01)

(58) Field of Classification Search
CPC ............. B60H 1/3205; B60H 1/00778; B60H 1/00764; B60H 1/3208; B60H 2001/3266; B60H 2001/327
See application file for complete search history.

(56) References Cited

U.S. PATENT DOCUMENTS 7,100,383 B2 * 9/2006 Sugesawa ............ B60H 1/3208
62/133
7,478,537 B2 * 1/2009 Makishima ............ B60H 1/322
62/133
(Continued)

FOREIGN PATENT DOCUMENTS

JP H06143993 A 5/1994
JP 2003306031 A 10/2003
(Continued)

*Primary Examiner* — Marc E Norman
(74) *Attorney, Agent, or Firm* — Harness, Dickey & Pierce, P.L.C.

(57) ABSTRACT

In a vehicle air conditioner, a controller is configured (i) to set a target cooling temperature of air cooled by a cooling heat exchanger, (ii) to control an operation of a compressor based on a cooling temperature and the target cooling temperature of the cooling heat exchanger, and (iii) to determine a traveling state of the vehicle. The controller is configured to set a normal target temperature as the target cooling temperature when the vehicle is traveling with a normal condition, and to set a modified target temperature higher than the normal target temperature as the target cooling temperature when the vehicle starts decelerating. In addition, the controller is configured to cause the compressor to stop operating when the vehicle starts decelerating, and to cause the compressor to restart operating when the cooling temperature detected by a temperature sensor is equal to or higher than the modified target temperature.

9 Claims, 5 Drawing Sheets

(56) References Cited

U.S. PATENT DOCUMENTS

| | | | |
|---|---|---|---|
| 9,333,832 B2 * | 5/2016 | Burns | B60H 1/005 |
| 2003/0192326 A1 | 10/2003 | Masuda et al. | |
| 2005/0066669 A1 | 3/2005 | Sugesawa et al. | |
| 2005/0086953 A1 | 4/2005 | Sugesawa et al. | |
| 2013/0319026 A1 * | 12/2013 | Tsuji | F25B 49/02 |
| | | | 62/216 |
| 2016/0047562 A1 * | 2/2016 | Bartlett | F28F 1/022 |
| | | | 62/115 |
| 2018/0312041 A1 * | 11/2018 | Danjyo | F28D 1/05383 |

FOREIGN PATENT DOCUMENTS

| | | |
|---|---|---|
| JP | 2004237752 A | 8/2004 |
| JP | 2005104305 A | 4/2005 |
| JP | 2005104306 A | 4/2005 |
| JP | 2010234837 A | 10/2010 |

* cited by examiner

FIG. 5 a cooling heat exchanger is configured to exchange heat between air to be blown into an interior of the vehicle and a refrigerant of a refrigerant cycle, and to cool the air. The temperature detector is configured to detect a cooling temperature of the air cooled by the cooling heat exchanger. The compressor is driven by an engine of the vehicle and is configured to compress and discharge the refrigerant of the refrigerant cycle. The target temperature setting unit is configured to set a target cooling temperature of the air cooled by the cooling heat exchanger. The compressor control unit is configured to control an operation of the compressor based on the cooling temperature and the target cooling temperature. The traveling state determination unit is configured to determine a traveling state of the vehicle.

VEHICLE AIR CONDITIONER

CROSS REFERENCE TO RELATED APPLICATION

The present application is a continuation application of International Patent Application No. PCT/JP2021/004118 filed on Feb. 4, 2021, which designated the U.S. and claims the benefit of priority from Japanese Patent Application No. 2020-074539 filed on Apr. 20, 2020. The entire disclosures of all of the above applications are incorporated herein by reference.

TECHNICAL FIELD

The present disclosure relates to an air conditioner for a vehicle.

BACKGROUND

In an air conditioner for a vehicle, cold energy may be stored in an evaporator during a vehicle traveling, and may be used while the vehicle is stopped.

SUMMARY

According to an aspect of the present disclosure, in an air conditioner for a vehicle, a target temperature setting unit may be configured to set a target cooling temperature of air cooled by a cooling heat exchanger, a compressor control unit may be configured to control an operation of a compressor based on a cooling temperature of the cooling heat exchanger and the target cooling temperature, and a traveling state determination unit may be configured to determine a traveling state of the vehicle.

The target temperature setting unit may be configured to set a normal target temperature as the target cooling temperature when the traveling state determination unit determines that the vehicle is traveling normally, and to set a modified target temperature higher than the normal target temperature as the target cooling temperature when the traveling state determination unit determines that the vehicle starts decelerating.

The compressor control unit may be configured to cause the compressor to stop operating when the traveling state determination unit determines that the vehicle starts decelerating, and to cause the compressor to start operating when the cooling temperature detected by the temperature detection unit is equal to or higher than the modified target temperature. Alternatively, the compressor control unit may be configured to cause the compressor to stop operating when the traveling state determination unit determines that the vehicle starts decelerating, and to cause the compressor to start operating when a predetermined time elapses from the operation stop of the compressor.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

In an air conditioner for a vehicle, cold energy is stored in an evaporator during a deceleration vehicle traveling, and a target cooling temperature of the evaporator is set at a modified temperature, which is higher than a reference temperature by a predetermined value at the end of the deceleration traveling. This vehicle air conditioner achieves the extension of a stop time of a compressor while the vehicle is stopped within a range not affecting a cooling feeling.

However, in a case where the cold energy stored in the evaporator during traveling is used after the vehicle stops in the vehicle air conditioner, the stop time of the vehicle varies depending on conditions such as a road environment, and hence the cold energy stored in the evaporator may not be used up when the stop time of the vehicle is short, for example. In such a case, the stop time of the compressor is shortened, and the fuel-saving effect is reduced in the vehicle air conditioner.

In view of the above point, an object of the present disclosure is to improve a fuel-saving effect in a vehicle air conditioner that cools a vehicle interior in a case where a compressor is stopped while the vehicle is stopped.

According to a first exemplar of the present disclosure, an air conditioner for a vehicle includes a cooling heat exchanger, a compressor, a target temperature setting unit, a compressor control unit, and a traveling state determination unit.

The cooling heat exchanger is configured to exchange heat between air to be blown into an interior of the vehicle and a refrigerant of a refrigerant cycle, and to cool the air. The temperature detector is configured to detect a cooling temperature of the air cooled by the cooling heat exchanger. The compressor is driven by an engine of the vehicle and is configured to compress and discharge the refrigerant of the refrigerant cycle. The target temperature setting unit is configured to set a target cooling temperature of the air cooled by the cooling heat exchanger. The compressor control unit is configured to control an operation of the compressor based on the cooling temperature and the target cooling temperature. The traveling state determination unit is configured to determine a traveling state of the vehicle.

The target temperature setting unit is configured to set a normal target temperature as the target cooling temperature when the traveling state determination unit determines that the vehicle is traveling normally, and to set a modified target temperature higher than the normal target temperature as the target cooling temperature when the traveling state determination unit determines that the vehicle starts decelerating.

The compressor control unit is configured to cause the compressor to stop operating when the traveling state determination unit determines that the vehicle starts decelerating, and to cause the compressor to start operating when the cooling temperature detected by the temperature detection unit is equal to or higher than the modified target temperature.

According to a second exemplar of the present disclosure, the compressor control unit is configured to cause the compressor to stop operating when the traveling state determination unit determines that the vehicle starts decelerating, and to cause the compressor to start operating when a predetermined time elapses from the operation stop of the compressor.

Accordingly, the cooling of the vehicle interior can be performed using the cold energy stored in the evaporator even during the deceleration of the vehicle in addition to during the stop of the vehicle. As a result, even when the stop time of the vehicle is short, the stop time of the compressor can be made as long as possible by effectively using the cold energy stored in the evaporator, and the fuel-saving effect can be improved.

Hereinafter, a plurality of embodiments for carrying out the present disclosure will be described with reference to the drawings. In each embodiment, parts corresponding to an item described in the prior embodiment are denoted by the same reference numerals, and redundant description may be omitted. When only a part of the configuration is described in each embodiment, another embodiment described previously may be applied to the other parts of the configuration. Not only a combination of parts that are specifically indicated as combinable in each embodiment but also a partial combination of embodiments without being explicitly indicated is possible when no particular obstacle to the combination arises.

First Embodiment

A first embodiment of the present disclosure will be described with reference to the drawings.

Figure 1:
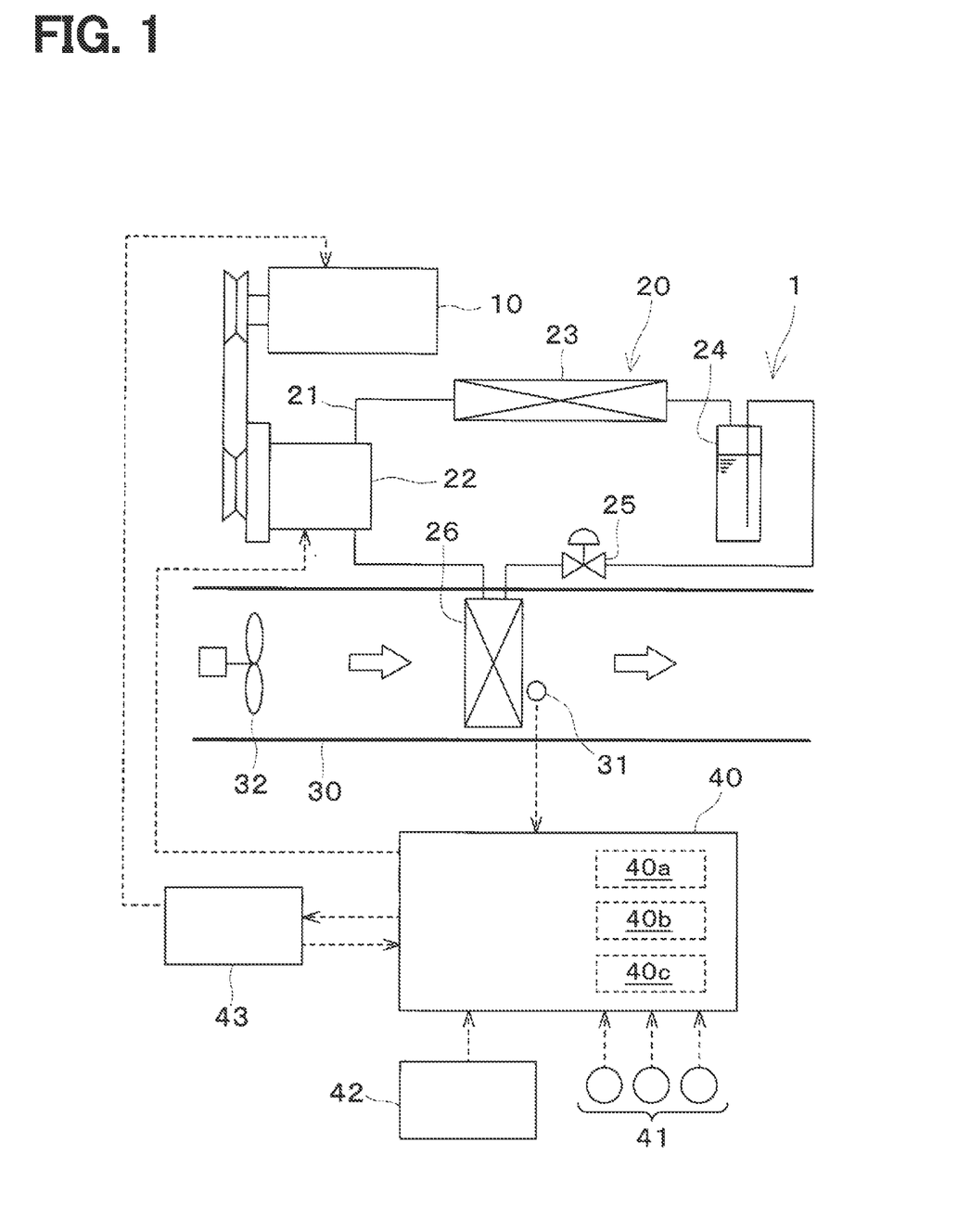
FIG. 1 is a schematic diagram illustrating an air conditioner for a vehicle according to a first embodiment of the present disclosure.

An air conditioner 1 for a vehicle illustrated in FIG. 1 is mounted on, for example, a vehicle including an engine 10, which is an internal combustion engine for traveling, and is configured to perform an air-conditioning operation of the interior of the vehicle. The vehicle of the present embodiment performs idling stop control for stopping the engine 10 while the vehicle is stopped temporarily. The idling stop control is a control operation for saving fuel consumption by stopping the engine 10 when the vehicle is stopped.

The engine 10 is an internal combustion engine mounted on the vehicle, for example. The vehicle on which the air conditioner 1 is mounted may be, for example, a hybrid vehicle including an electric motor for traveling in addition to the engine 10.

The vehicle air conditioner 1 includes a refrigeration cycle device 20. The refrigeration cycle device 20 is provided with a refrigerant cycle 21 (i.e., refrigerant flow path) through which a refrigerant circulates. In the present embodiment, a hydrofluoroolefin (HFO) refrigerant (specifically, R1234yf) is employed as the refrigerant. The refrigeration cycle device 20 is a vapor-compression subcritical refrigeration cycle in which the refrigerant pressure on the high-pressure side before being decompressed does not exceed the critical pressure of the refrigerant.

The refrigerant cycle 21 is provided with a compressor 22, a condenser 23, a liquid receiver 24, an expansion valve 25, and an evaporator 26. The components 22 to 26 of the refrigeration cycle device 20 are coupled by a refrigerant flow path to constitute a closed refrigerant circuit.

The compressor 22 sucks the refrigerant, compresses the refrigerant to a high-pressure refrigerant, and discharges the compressed refrigerant. The compressor 22 of the present embodiment is an engine-driven compressor that is driven by a rotational driving force transmitted from the engine 10 for vehicle traveling via a pulley, a belt, and the like. The operation of the compressor 22 is controlled by an air conditioning controller 40. The air conditioning controller 40 will be described later.

The compressor 22 may be either a variable displacement compressor or a fixed displacement compressor. The variable displacement compressor is a compressor capable of adjusting refrigerant discharge capacity in accordance with a capacitive discharge change. The fixed displacement compressor is a compressor capable of adjusting refrigerant discharge capacity by changing the operating rate of the compressor by disconnection of an electromagnetic clutch.

The compressor 22 is provided, for example, in the engine compartment of the vehicle and is driven by the driving force of the engine 10. When the idling stop control is performed, the compressor 22 stops, and the refrigeration cycle device 20 stops. That is, the idling stop control can also be referred to as compressor stop control.

In the present embodiment, the vehicle air conditioner 1 can also be operated during the idling stop control. During the idling stop control, conditioned air is blown into the vehicle interior in a state where the compressor 22 is stopped.

The refrigerant inlet side of the condenser 23 is connected to the discharge side of the compressor 22. The condenser 23 is a heat exchanger that exchanges heat between a high-pressure gas-phase refrigerant discharged from the compressor 22 and outside air blown from a cooling fan (not illustrated). The condenser 23 radiates heat to condense the high-pressure gas-phase refrigerant.

The liquid receiver 24 is connected to the outlet side of the condenser 23. The liquid receiver 24 stores therein a surplus liquid refrigerant in the refrigeration cycle device 20.

The expansion valve 25 is used as an example of a decompression valve, and is connected to the outlet side of the liquid receiver 24. The expansion valve 25 is a refrigerant flow rate adjustment mechanism that decompresses the refrigerant flowing out of the liquid receiver 24 and adjusts a circulation refrigerant flow rate of the refrigerant circulating in the refrigerant cycle.

The expansion valve 25 of the present embodiment is a thermal expansion valve that changes a throttle opening so that the superheat of the refrigerant on the outlet side of the evaporator 26 approaches a predetermined reference superheat. The thermal expansion valve may be a mechanical variable throttle mechanism including: a temperature-sensitive portion having a deformation member (specifically, a diaphragm) that deforms in accordance with the temperature and pressure of the refrigerant on the outlet side of the evaporator 26; and a valve element portion that is displaced in accordance with the deformation of the deformation member to change a throttle opening.

The evaporator 26 is connected to the outlet of the expansion valve 25. The evaporator 26 is a cooling heat exchanger that cools air blown into the interior of the vehicle. The evaporator 26 exchanges heat between the blown air to the vehicle interior and the low-pressure refrigerant flowing out of the expansion valve 25. The evaporator 26 cools the blown air by evaporating the low-pressure refrigerant to exert a heat absorbing action.

Figure 2:
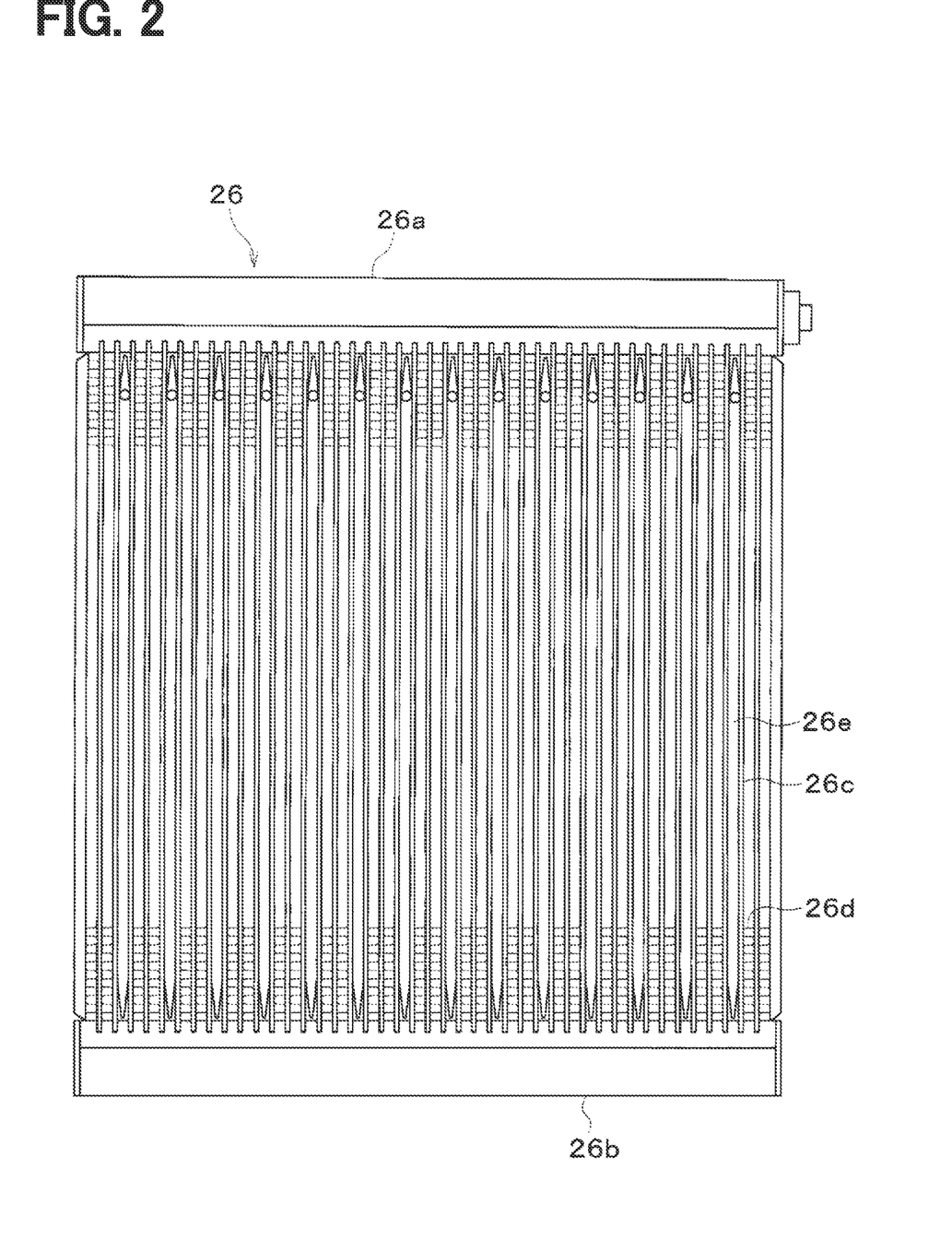
FIG. 2 is a front view illustrating an evaporator.

Here, the evaporator 26 will be described with reference to FIG. 2. As illustrated in FIG. 2, the evaporator 26 of the present embodiment includes a pair of header tanks 26a, 26b and a plurality of tubes 26c connecting the header tanks 26a, 26b. The pair of header tanks 26a, 26b are disposed in parallel at a predetermined distance from each other. The plurality of tubes 26c are arranged at equal intervals between the header tanks 26a, 26b. Each tube 26c communicates, at its ends, with the insides of the corresponding header tanks 26a, 26b.

The tube 26c is a multi-hole tube formed in a flat shape and having a plurality of refrigerant passages therein. The tube 26c can be obtained by, for example, an extrusion method. The plurality of refrigerant passages extend along the longitudinal direction of the tube 26c and open at both ends of the tube 26c.

A plurality of gaps are formed between the plurality of tubes 26c. In the plurality of gaps, a plurality of fins 26d and a plurality of cold-storage material containers 26e are provided. The plurality of fins 26d and the plurality of cold-storage material containers 26e are arranged with a predetermined regularity, for example.

The evaporator 26 includes fins 26d for increasing a contact area with air supplied to the vehicle interior. The fin 26d is disposed in an air passage defined between two adjacent tubes 26c. The fin 26d is thermally coupled to the two adjacent tubes 26c. The fin 26d is brazed to the two adjacent tubes 26c. The fin 26d is formed by, for example, bending a thin plate of metal such as aluminum into a wave shape.

The cold-storage material container 26e is disposed between two adjacent tubes 26c. The cold-storage material container 26e is made of metal such as aluminum, and is formed in a tube shape. The cold-storage material container 26e is thermally coupled to two adjacent tubes 26c disposed on both sides thereof. The cold-storage material container 26e of the present embodiment is brazed to the tube 26c.

The cold-storage material container 26e stores therein a cold storage material capable of storing cold energy. As the cold storage material, for example, paraffin having a solidifying point of about 10° C. can be used. The evaporator 26 is a cold storage heat exchanger that stores cold energy by solidifying a cold storage material when evaporating the refrigerant to exert a heat absorbing action.

In the evaporator 26, cold energy is stored into the cold storage material during the operation of the compressor 22. In the evaporator 26, when the engine 10 is stopped and the compressor 22 is stopped, the cold energy is released from the cold storage material. Accordingly, even when the compressor 22 is temporarily stopped, it is possible to cool the blown air to the vehicle interior by using the cold energy stored in the evaporator 26 to perform the indoor cooling.

When the temperature of air blown from the evaporator 26 exceeds a predetermined temperature or when a restart condition for the engine 10 is satisfied, the engine 10 is restarted, and the compressor 22 starts operating. The cold storage function of the evaporator 26 can increase the time required for the air blowing temperature of the evaporator 26 to rise. As a result, the stop time of the compressor 22 can be lengthened, and the power saving effect of the compressor 22 can be enhanced. In addition, as the stop time of the compressor 22 is extended, the stop time of the engine 10 can be extended, and the fuel-saving effect of the engine 10 can be enhanced.

Returning to FIG. 1, the evaporator 26 is disposed inside the air conditioning case 30. The air conditioning case 30 constitutes the air passage of the vehicle air conditioner 1, through which air is blown into the vehicle interior.

In the air conditioning case 30, an evaporator blowing temperature sensor 31 is provided at a portion immediately downstream of the evaporator 26 in the airflow direction. The evaporator blowing temperature sensor 31 is a temperature detection unit that detects a temperature of blown air immediately after passing through the evaporator 26 so as to detect an evaporator cooling temperature TE that is a cooling temperature of the blown air cooled by the evaporator 26. The evaporator cooling temperature TE can also be referred to as the temperature of the evaporator 26. The sensor signal of the evaporator blowing temperature sensor 31 is input to the air conditioning controller 40.

The air conditioning case 30 is provided with a blower 32. The blower 32 constitutes a blowing unit that generates an airflow in the air conditioning case 30. The blower 32 blows air inside the vehicle compartment (i.e., inside air) or air outside the vehicle compartment (i.e., outside air) drawn from an inside/outside air switching box (not illustrated), toward the vehicle interior (i.e., vehicle compartment). The operation of the blower 32 is controlled by the air conditioning controller 40.

The air blown by the blower 32 passes through the evaporator 26 (i.e., cooling heat exchanger), then passes through a heater unit (i.e., heating heat exchanger, not illustrated), and is blown into the vehicle interior from at least one of air outlets (not illustrated). The air outlets include a face air outlet that blows out conditioned air to the upper body of an occupant, a foot air outlet that blows out conditioned air to the foot of the occupant in the vehicle interior, and a defroster air outlet that blows out conditioned air to the inner surface of the windshield of the vehicle. By switching an air outlet mode such as a face mode, a foot mode, and a defroster, the conditioned air is blown out from at least one air outlet selected.

The vehicle air conditioner 1 includes the air conditioning controller 40. The air conditioning controller 40 is made up of a microcomputer including a central processing unit (CPU), a read-only memory (ROM), a random-access memory (RAM) and the like, and peripheral circuits thereof. The air conditioning controller 40 performs various calculations and processing based on a control program stored in the ROM and controls operations of various control target devices connected to the output side.

In addition to the sensor signal from the evaporator blowing temperature sensor 31, sensor signals from the sensor group 41 are input to the air conditioning controller 40. The sensor group 41 includes an inside air temperature sensor, an outside air temperature sensor, a solar radiation sensor, and the like. The inside air temperature sensor detects an inside air temperature (i.e., vehicle interior temperature). The outside air temperature sensor detects an outside air temperature (i.e., vehicle exterior temperature). The solar radiation sensor detects the amount of solar radiation with which the vehicle interior is irradiated.

Switch signals from an operation panel (not illustrated) are input to the air conditioning controller 40. The operation switches of the operation panel include a temperature setting switch, an air volume changeover switch, a blowing mode changeover switch, an inside/outside air changeover switch, an air conditioner switch that outputs an operation command of the compressor 22, and the like.

The air conditioning controller 40 controls the operation of the compressor 22 based on the evaporator cooling temperature TE and a target cooling temperature. The air conditioning controller 40 sets a normal target temperature TEO as the target cooling temperature of the air flowing out of the evaporator 26 at the time of normal traveling of the vehicle, and controls the operation of the compressor 22 so that the evaporator cooling temperature TE approaches the normal target temperature TEO. The time of normal traveling of the vehicle may be, for example, a traveling state in which the vehicle speed exceeds 0 km/h and deceleration traveling is not being performed.

The normal target temperature TEO is determined based on a target blowing temperature TAO of the air blown into the vehicle interior with reference to a control map stored in advance in the air conditioning controller 40. The target blowing temperature TAO is calculated using the detection signals of various controlling sensors and the operation signal of the operation panel.

The air conditioning controller 40 changes the target cooling temperature of the air flowing out of the evaporator 26 to a modified target temperature TEOK when the vehicle starts decelerating, and the air conditioning controller 40 controls the compressor 22 based on the evaporator cooling temperature TE and the modified target temperature TEOK in this condition.

Even when the vehicle stops after the vehicle deceleration, the target cooling temperature of the blown air in the evaporator 26 is maintained at the modified target temperature TEOK. That is, the control of the compressor 22 based on the modified target temperature TEOK of the evaporator 26 is performed during the deceleration and stop of the vehicle.

The modified target temperature TEOK is set to be higher than the normal target temperature TEO, which is the reference value, by a predetermined temperature. The predetermined temperature is set as a value at which the comfort of the occupant can be maintained, in other words, a value at which the occupant can tolerate a change in the temperature of the blown air blown into the vehicle interior. In the present embodiment, the modified target temperature TEOK is set to be higher than the normal target temperature TEO by about 6° C.

The compressor 22 stops operating when the vehicle starts decelerating. When the evaporator cooling temperature TE exceeds the modified target temperature TEOK, the compressor 22 restarts operating.

The air conditioning controller 40 is connected to a brake controller 42 and an engine controller 43. The brake controller 42 and the engine controller 43 include a known microcomputer including a CPU, a ROM, a RAM, and the like, and peripheral circuits thereof. The brake controller 42 performs various controls related to a vehicle brake (not illustrated). The engine controller 43 performs various controls related to the engine 10.

A brake operation signal related to an operation state of a brake pedal (not illustrated) is input from the brake controller 42 to the air conditioning controller 40. A signal related to the operation state of the engine 10 and an accelerator operation signal related to an operation state of an accelerator pedal (not illustrated) are input from the engine controller 43 to the air conditioning controller 40.

The air conditioning controller 40 determines the traveling state of the vehicle based on the signals received from the brake controller 42 and the engine controller 43. The traveling state of the vehicle includes the operation state of the brake, the operation state of the accelerator, the deceleration start of the vehicle, acceleration from deceleration, a stop from deceleration, a departure from a stop, the operation state of the engine 10, and the like.

The operation state of the brake includes a brake-on state when the brake operation is detected, and a brake-off state when the brake operation is no longer detected. Similarly, the operation state of the accelerator includes an accelerator-on state when the accelerator operation is detected, and an accelerator-off state when the accelerator operation is no longer detected.

In the air conditioning controller 40, a control configuration or a control circuit for setting the target cooling temperature of the blown air is a target temperature setting unit 40a. In the air conditioning controller 40, a configuration or a control circuit for controlling the operation of the compressor 22 is a compressor control unit 40b. In the air conditioning controller 40, a configuration or a control circuit for determining the traveling state of the vehicle is a traveling state determination unit 40c.

The engine controller 43 controls fuel injection of the engine 10 based on the operation amount of the accelerator pedal. The engine controller 43 of the present embodiment performs fuel cut control to stop fuel injection of the engine 10 when a predetermined fuel injection stop condition is satisfied. The fuel injection stop condition may be, for example, a case where the rotation speed of the engine 10 is equal to or higher than a predetermined rotation speed and the accelerator-off state is detected. Thereby, the fuel cut control is performed when the vehicle is decelerating.

Moreover, the engine controller 43 of the present embodiment performs idling stop control. In the idling stop control, the engine 10 is stopped when a predetermined engine stop condition is satisfied while the engine 10 is operating, and the engine 10 is started when a predetermined engine restart condition is satisfied while the engine 10 is stopped. The engine stop condition may be, for example, a case where the vehicle speed is 0 km/h and the brake-on state is detected. The engine restart condition may be, for example, a case where the vehicle speed exceeds 0 km/h or the brake-off state is detected while the engine 10 is stopped.

During the idling stop control subsequent to the fuel cut control, the fuel injection to the engine 10 remains stopped. Then, the fuel injection to the engine 10 is restarted along with the restart of the engine 10.

Figure 3:
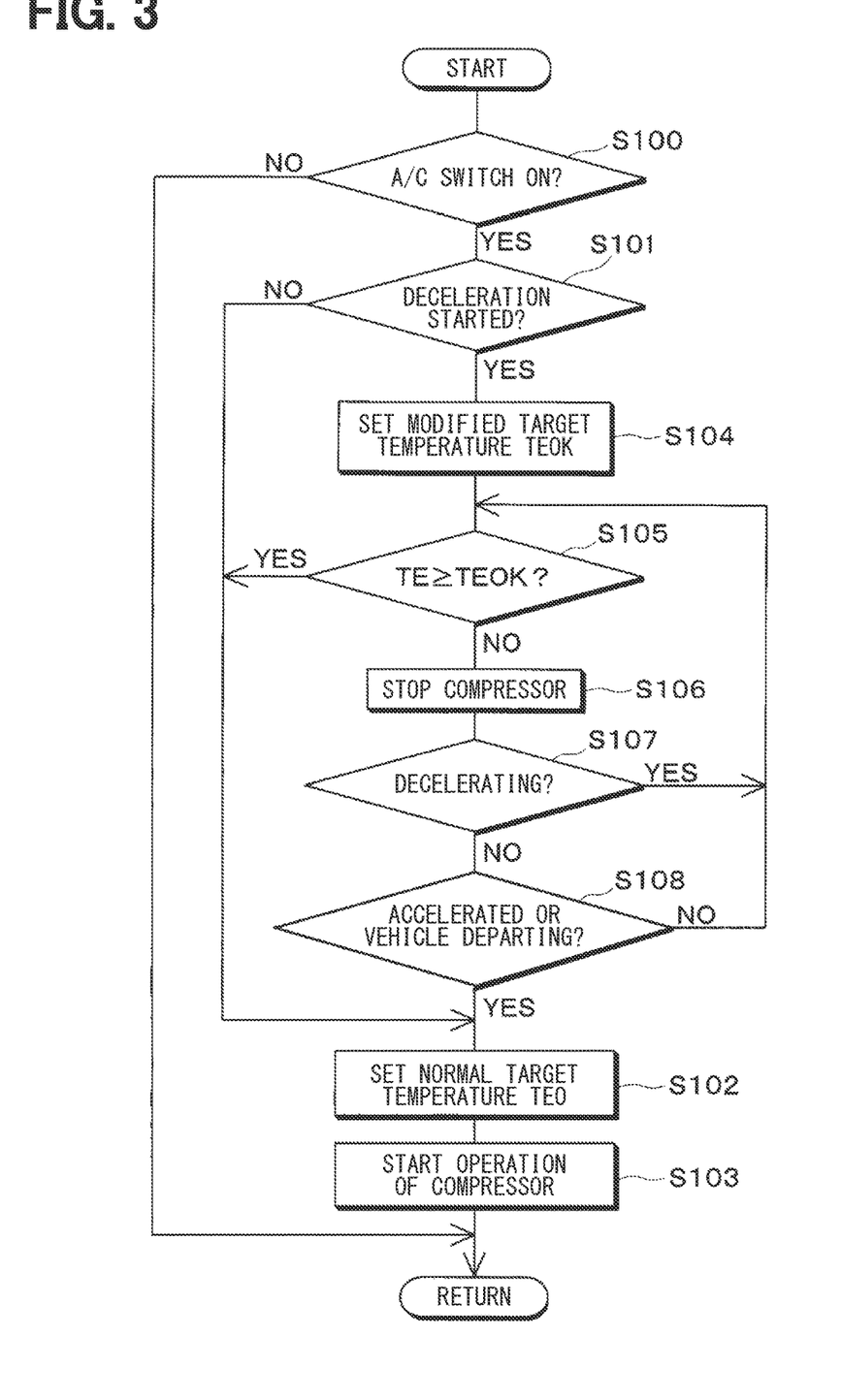
FIG. 3 is a flowchart illustrating a compressor control performed by the vehicle air conditioner according to the first embodiment.

Next, compressor control processing performed by the air conditioning controller 40 will be described with reference to the flowchart of FIG. 3.

In step S100, it is determined whether or not an air conditioner switch (i.e., NC switch) is turned on. When it is determined in the determination processing of S100 that the air conditioner switch is not turned on, the compressor control processing ends. On the other hand, when it is determined in the determination processing of S100 that the air conditioner switch is turned on, it is determined in S101 whether or not the vehicle has started decelerating. In S101, for example, when the vehicle speed exceeds 0 km/h and the accelerator-off state is detected or the brake-on state is detected, it can be determined that the vehicle starts decelerating.

When it is determined in the determination processing of S101 that the vehicle has not started decelerating, the normal target temperature TEO is set as the target cooling temperature of the evaporator 26 in S102, and the operation of the compressor 22 is started in S103. In this case, the air conditioning controller 40 controls the compressor 22 so that the evaporator cooling temperature TE approaches the normal target temperature TEO.

On the other hand, when it is determined in the determination processing of S101 that the vehicle starts decelerating, the modified target temperature TEOK is set as the target cooling temperature of the evaporator 26 in S104.

Next, in S105, it is determined whether or not the detected evaporator cooling temperature TE is equal to or higher than the modified target temperature TEOK. When it is determined in the determination processing of S105 that the evaporator cooling temperature TE is equal to or higher than the modified target temperature TEOK, the processing of each of S102 and S103 is performed.

On the other hand, when it is determined in the determination processing of S105 that the evaporator cooling temperature TE is not equal to or higher than the modified target temperature TEOK, that is, when it is determined that the evaporator cooling temperature TE is lower than the modified target temperature TEOK, the compressor 22 is stopped in S106. While the compressor 22 is stopped, the blown air to the vehicle interior is cooled using the cold energy stored in the evaporator 26.

Next, in S107, it is determined whether or not the vehicle is decelerating. When it is determined in the determination processing of S107 that the vehicle is decelerating, the processing returns to S105. After the processing proceeds to S105, when it is determined that the evaporator cooling temperature TE is equal to or higher than the modified target temperature TEOK during deceleration, the processing of each of S102 and S103 is performed.

On the other hand, when it is determined in the determination processing of S107 that the vehicle is not decelerating, it is determined in S108 whether or not the vehicle is accelerated during a vehicle deceleration or whether or not the vehicle is departed during a vehicle stop state after a vehicle deceleration. In S108, for example, when the vehicle speed exceeds 0 km/h and the accelerator is turned on, it can be determined that the vehicle is accelerated. Further, in S108, for example, when the vehicle speed exceeds 0 km/h from the vehicle stop state, it can be determined that the vehicle is departed. That is, when the vehicle speed exceeds 0 km/h during the stop of the vehicle, a vehicle departing state can be detected. In the vehicle that performs the idling stop control as in the present embodiment, even when the engine 10 is started to prepare for departure, it can be determined in S108 that the vehicle is departed. That is, a vehicle departing state where the vehicle departs from the vehicle stop state includes a case where the vehicle speed exceeds 0 km/h and a case where the engine 10 is started to prepare for a vehicle departure even when the vehicle speed is 0 km/h.

When it is determined in the determination processing of S108 that the vehicle is accelerated or departed, that is, the vehicle is still stopped, the control processing returns to the processing of S105. Thus, even when the vehicle is stopped after decelerating, the modified target temperature TEOK remains to be set as the target cooling temperature. After the processing proceeds to S105, when the evaporator cooling temperature TE exceeds the modified target temperature TEOK while the vehicle is stopped, the processing of each of S102 and S103 is performed. On the other hand, when it is determined in the determination processing of S108 that the vehicle is accelerated or departed, the processing of each of S102 and S103 is performed.

Figure 4:
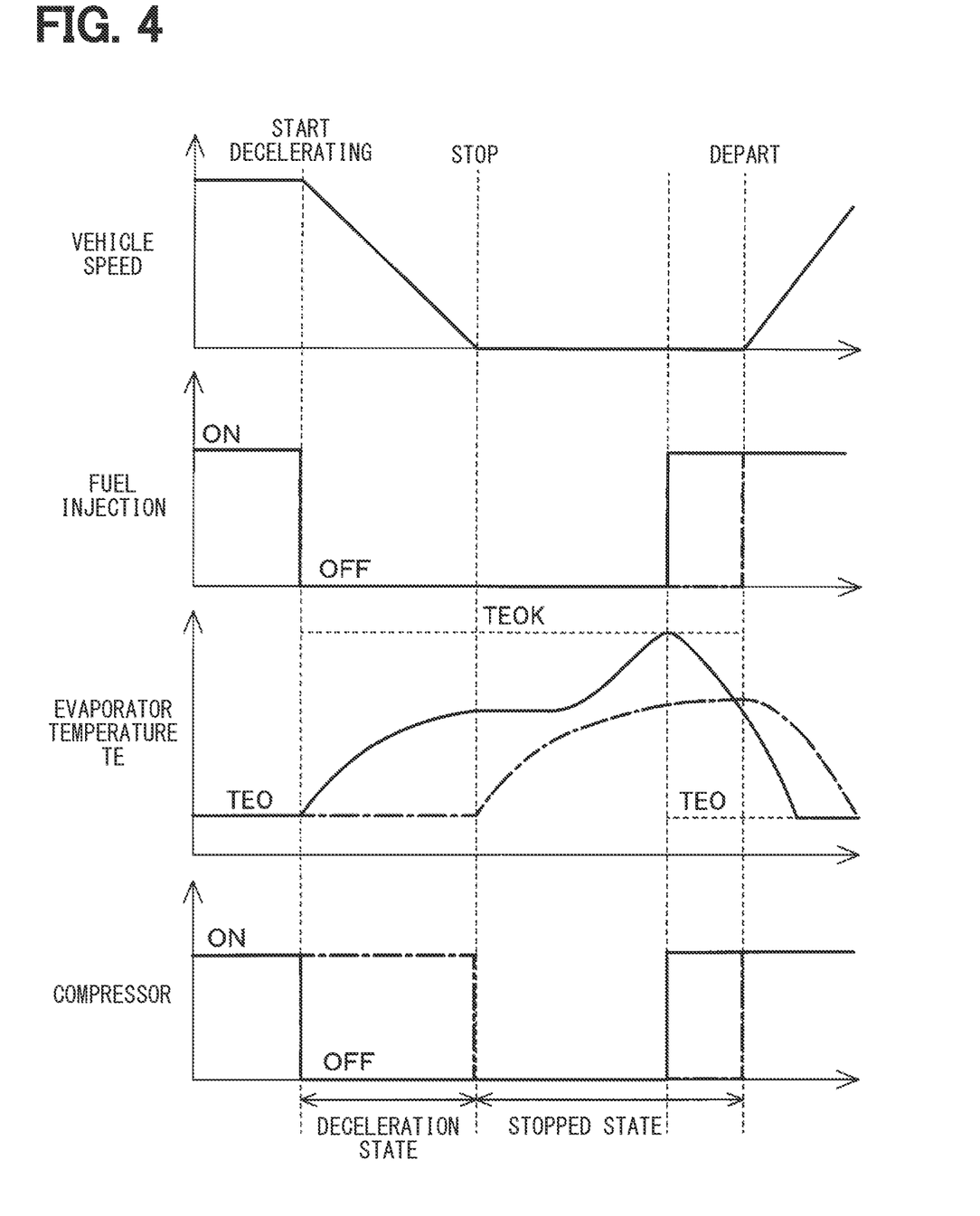
FIG. 4 is a timing chart illustrating an operation of the vehicle air conditioner according to the first embodiment.

Next, the operation of the vehicle air conditioner according to the present embodiment will be described with reference to a timing chart of FIG. 4. In FIG. 4, the operation of the vehicle air conditioner according to the present embodiment is indicated by a solid line, and the operation of an air conditioner for a vehicle according to a comparative example is indicated by an alternate long and short dash line.

As illustrated in FIG. 4, at the time of normal traveling of the vehicle, the target cooling temperature of the blown air is set to the normal target temperature TEO. The operation of the compressor 22 is controlled so that the evaporator cooling temperature TE approaches the normal target temperature TEO.

In the present embodiment, the target cooling temperature is changed to the modified target temperature TEOK when deceleration is started and the compressor 22 is stopped. In the present embodiment, the target cooling temperature is maintained at the modified target temperature TEOK even while the vehicle is stopped after decelerating. The fuel injection to the engine 10 is stopped when the deceleration is started, and the engine 10 is stopped when the vehicle is stopped.

When the evaporator cooling temperature TE exceeds the modified target temperature TEOK while the vehicle is stopped, or when the engine 10 is started while the vehicle is stopped, the target cooling temperature is changed to the normal target temperature TEO, and the compressor 22 is started. When the evaporator cooling temperature TE exceeds the modified target temperature TEOK while the vehicle is stopped, the engine 10 starts with the start of the compressor 22, and the fuel injection to the engine 10 is restarted.

The example illustrated in FIG. 4 illustrates a case where the evaporator cooling temperature TE exceeds the modified target temperature TEOK while the vehicle is stopped. The evaporator cooling temperature TE having risen to the modified target temperature TEOK decreases toward the normal target temperature TEO.

In the comparative example, the target cooling temperature is maintained at the normal target temperature TEO during the deceleration of the vehicle. Then, the target cooling temperature is changed to the modified target temperature TEOK when the vehicle starts stopping, and the compressor 22 is stopped.

In the comparative example, the vehicle departs before the evaporator cooling temperature TE reaches the modified target temperature TEOK while the vehicle is stopped. Hence the compressor 22 is started before the evaporator cooling temperature TE reaches the modified target temperature TEOK. That is, in the comparative example, the cold energy stored in the evaporator 26 is not used up, and the fuel-saving effect is low.

In the present embodiment described above, the target cooling temperature is changed to the modified target temperature TEOK that is higher than the normal target temperature TEO when the vehicle starts decelerating, and then the compressor 22 is stopped. Accordingly, the indoor cooling can be performed using the cold energy stored in the evaporator 26 even during the deceleration of the vehicle in addition to during the stop of the vehicle. As a result, even in such a case where the stop time of the vehicle is short, the cold energy stored in the evaporator 26 can be used effectively. Therefore, in any vehicle that performs the fuel cut control or/and the idling stop control, the stop time of the fuel injection to the engine 10 can be made as long as possible, which can improve the fuel-saving effect. Moreover, the stop time of the compressor 22 can be made as long as possible, which can also improve the fuel-saving effect.

In the present embodiment, the evaporator 26 including a cold storage material is used. This makes it possible to increase the amount of cold storage of the evaporator 26. Therefore, the time until the evaporator cooling temperature TE reaches the modified target temperature TEOK can be lengthened, and the stop time of the compressor 22 can be lengthened effectively.

Second Embodiment

Next, a second embodiment of the present disclosure will be described. Hereinafter, only differences from the first embodiment will be mainly described.

In the second embodiment, the operation of the compressor 22 is stopped when the vehicle starts decelerating, and the operation of the compressor 22 is started at a time point when a predetermined time has elapsed from the deceleration start. The predetermined time is a time during which the comfort of the occupant can be maintained after the compressor 22 is stopped, and is set as a compressor stoppable time T1 during which the occupant can tolerate a change in the temperature of the blown air blown into the vehicle interior after the compressor 22 is stopped. The compressor stoppable time T1 may be, for example, a time required for the evaporator cooling temperature TE to reach a predetermined temperature (e.g., the modified target temperature TEOK of the first embodiment) higher than the normal target temperature TEO.

The compressor stoppable time T1 varies depending on the amount of cold storage of the evaporator 26. For example, the larger the amount of cold storage of the evaporator 26, the longer the compressor stoppable time T1, and the smaller the cold storage capacity of the evaporator 26, the shorter the compressor stoppable time T1.

The amount of cold storage of the evaporator 26 is related to the operation time of the compressor 22, and the operation time of the compressor 22 is related to the traveling state of the vehicle. Examples of information on the traveling state of the vehicle include the traveling time of the vehicle (i.e., the operation time of the engine 10), the rotation speed of the engine 10, and the like.

Also, the compressor stoppable time T1 varies depending on the outside air temperature. For example, the lower the outside air temperature, the longer the compressor stoppable time T1, and the higher the outside air temperature, the shorter the compressor stoppable time T1.

Therefore, the compressor stoppable time T1 can be calculated based on at least one of the traveling time of the vehicle, the rotation speed of the engine 10, and the outside air temperature. The compressor stoppable time T1 may be calculated based on any one of the traveling time of the vehicle, the rotation speed of the engine 10, and the outside air temperature, or the compressor stoppable time T1 may be calculated using any combination of the traveling time of the vehicle, the rotation speed of the engine 10, and the outside air temperature.

Next, compressor control processing performed by the air conditioning controller 40 of the second embodiment will be described with reference to a flowchart of FIG. 5. Processing of each of S100 to S103 and S106 to S108 in FIG. 5 has the same content as the processing in the first embodiment described with reference to FIG. 3, and detailed description thereof will thus be omitted.

Figure 5:
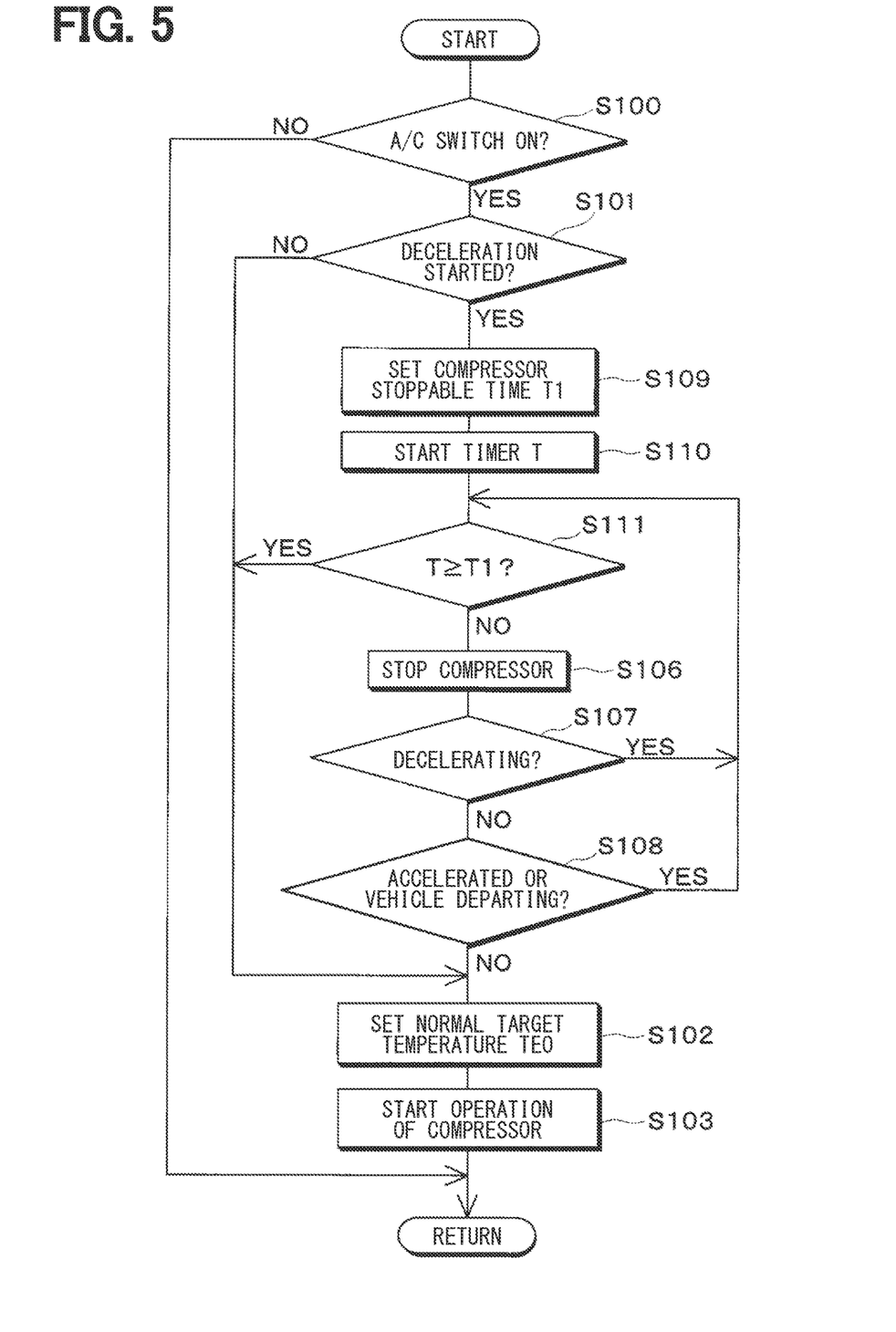
FIG. 5 is a flowchart illustrating a compressor control performed by an air conditioner for a vehicle according to a second embodiment of the present disclosure.

As illustrated in FIG. 5, in the second embodiment, when it is determined in the determination processing of S101 that the vehicle starts decelerating, the compressor stoppable time T1 is set in S109, and a timer T is started in S110. In the processing of S109, for example, the compressor stoppable time T1 can be set based on the information on the traveling state of the vehicle. The timer T is used to measure an elapsed time from the operation stop of the compressor 22. The elapsed time from the operation stop of the compressor 22 is also the elapsed time from the deceleration start of the vehicle.

Next, in S111, it is determined whether or not the timer T has become equal to or longer than the compressor stoppable time T1. When it is determined in the determination processing of S111 that the timer T has become equal to or longer than the compressor stoppable time T1, the processing of each of S102 and S103 is performed. On the other hand, when it is determined in the determination processing of S111 that the timer T is not equal to or longer than the compressor stoppable time T1, processing of each of S106 to S108 is performed.

In the second embodiment described above, the operation of the compressor 22 is stopped when the vehicle starts decelerating, and the operation of the compressor 22 is restarted at a time point when the compressor stoppable time T1 has elapsed from the vehicle deceleration start. Accordingly, the indoor cooling can be performed using the cold energy stored in the evaporator 26 even during the deceleration of the vehicle in addition to during the stop of the vehicle. As a result, even when the stop time of the vehicle is short, the stop time of the compressor 22 can be made as long as possible by effectively using the cold energy stored in the evaporator 26, and the fuel-saving effect can be improved.

In the second embodiment, the compressor 22 starts operating at a time point when the measurement time by the timer T reaches the compressor stoppable time T1. This eliminates the need for the evaporator blowing temperature sensor 31 to measure the evaporator cooling temperature TE at the time of restart of the operation of the compressor 22 stopped in accordance with the deceleration start of the vehicle.

The present disclosure is not limited to the embodiments described above but can be variously modified as follows without departing from the spirit of the present disclosure. The means disclosed in each of the above embodiments may be appropriately combined within a feasible range.

For example, in each of the above embodiments, the example of using the evaporator 26 provided with the cold storage material has been described. However, the present disclosure is also applicable to a case where an evaporator not provided with the cold storage material is used.

In the above embodiments, the operation of the compressor 22 is stopped simultaneously with the deceleration start of the vehicle, but the operation of the compressor 22 may not necessarily be stopped simultaneously with the deceleration start of the vehicle. The operation of the compressor 22 may be stopped with respect to the deceleration start of the vehicle or may be stopped after a predetermined time elapses from the deceleration start of the vehicle. Specifically, the operation of the compressor 22 may be stopped at any timing from the deceleration start to the stop of the vehicle.

In the above embodiments, the example has been described where the vehicle air conditioner according to the present disclosure is applied to a vehicle that performs the idling stop control. However, the vehicle air conditioner according to the present disclosure is also applicable to a vehicle that does not perform the idling stop control.

In the above embodiments, the example has been described where the vehicle air conditioner according to the present disclosure is applied to the vehicle that performs the fuel cut control. However, the vehicle air conditioner according to the present disclosure is also applicable to a vehicle that does not perform the fuel cut control.

In each of the above embodiments, the deceleration start of the vehicle is determined based on the vehicle speed and the accelerator operation or the brake operation, but the present invention is not limited to this. For example, the deceleration start of the vehicle may be determined under different conditions.

Although the present disclosure has been described in accordance with the embodiments, it is understood that the present disclosure is not limited to the embodiments and structures. The present disclosure encompasses various modified examples and modifications within an equivalent scope. In addition, although various combinations and modes are shown in the present disclosure, other combinations and modes including only one element, more than that, or less than that, are also within the scope and idea of the present disclosure.

For example, according to an exemplar of the present disclosure, an air conditioner for a vehicle includes a refrigerant cycle, a temperature sensor and a controller. The refrigerant cycle includes a compressor driven by an engine of the vehicle to compress and discharge a refrigerant of the refrigerant cycle, and a cooling heat exchanger configured to cool air to be blown into an interior of the vehicle by exchanging heat with the refrigerant. The temperature sensor is configured to detect a cooling temperature of the air cooled by the cooling heat exchanger. The controller may include at least one processor configured (i) to set a target cooling temperature of the air cooled by the cooling heat exchanger, (ii) to control an operation of the compressor based on the cooling temperature and the target cooling temperature, and (iii) to determine a traveling state of the vehicle. Furthermore, the controller may be configured to set a normal target temperature as the target cooling temperature when the controller determines that the vehicle is traveling with a normal condition, and to set a modified target temperature higher than the normal target temperature as the target cooling temperature when the controller determines that the vehicle starts decelerating. In addition, the controller may be configured to cause the compressor to stop operating when the controller determines that the vehicle starts decelerating, and to cause the compressor to start operating when the cooling temperature detected by the temperature sensor is equal to or higher than the modified target temperature. Alternatively, the controller may be configured to cause the compressor to start operating when a predetermined time elapses from the operation stop of the compressor.

It is noted that a flowchart or the processing of the flowchart in the present disclosure includes sections (also referred to as steps), each of which is represented, for instance, as S100. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

What is claimed is:

1. An air conditioner for a vehicle, comprising:
a cooling heat exchanger configured to exchange heat between air to be blown into an interior of the vehicle and a refrigerant of a refrigerant cycle, and to cool the air;
a temperature detector configured to detect a cooling temperature of the air cooled by the cooling heat exchanger;
a compressor that is driven by an engine of the vehicle and is configured to compress and discharge the refrigerant of the refrigerant cycle;
a target temperature setting unit configured to set a target cooling temperature of the air cooled by the cooling heat exchanger;
a compressor control unit configured to control an operation of the compressor based on the cooling temperature and the target cooling temperature; and
a traveling state determination unit configured to determine a traveling state of the vehicle, wherein
the target temperature setting unit is configured to set a first target temperature as the target cooling temperature when the traveling state determination unit determines that the vehicle is in a traveling condition in which a vehicle traveling speed exceeds 0 and a deceleration traveling is not performed, and to set a second target temperature higher than the first target temperature as the target cooling temperature when the traveling state determination unit determines that the vehicle starts decelerating, and
the compressor control unit is configured to cause the compressor to stop operating when the traveling state determination unit determines that the vehicle starts decelerating, and to cause the compressor to start operating based on the cooling temperature and the second target temperature as the target cooling temperature when the cooling temperature detected by the temperature detection unit is equal to or higher than the second target temperature in the deceleration traveling.

2. The air conditioner for a vehicle according to claim 1, wherein
the compressor control unit is configured to cause the compressor to start operating after causing the compressor to stop operating, (i) when the traveling state determination unit determines that the vehicle accelerates during a vehicle decelerating, or (ii) when the traveling state determination unit determines that the vehicle departs while being stopped after decelerating.

3. The air conditioner for a vehicle according to claim 1, wherein
the traveling state determination unit determines that the vehicle starts decelerating, (i) when a speed of the vehicle exceeds 0 km/h and (ii) when an accelerator operation of the vehicle is no longer detected or a brake operation of the vehicle is detected.

4. The air conditioner for a vehicle according to claim 1, wherein the cooling heat exchanger includes a cold storage material configured to store a cold energy.

5. An air conditioner for a vehicle, comprising:
a cooling heat exchanger configured to exchange heat between air to be blown into an interior of the vehicle and a refrigerant of a refrigerant cycle, and to cool the air;
a temperature detector configured to detect a cooling temperature of the air cooled by the cooling heat exchanger;
a compressor that is driven by an engine of the vehicle and is configured to compress and discharge the refrigerant of the refrigerant cycle;
a target temperature setting unit configured to set a target cooling temperature of the air cooled by the cooling heat exchanger;
a compressor control unit configured to control an operation of the compressor based on the cooling temperature and the target cooling temperature; and
a traveling state determination unit configured to determine a traveling state of the vehicle, wherein
the compressor control unit is configured to cause the compressor to stop operating when the traveling state determination unit determines that the vehicle starts decelerating, and to cause the compressor to start operating when a predetermined time elapses from the operation stop of the compressor, and the compressor control unit sets the predetermined time based on at least one of a traveling time of the vehicle, a rotation speed of the engine, or an outside air temperature.

6. The air conditioner for a vehicle according to claim 5, wherein the cooling heat exchanger includes a cold storage material configured to store a cold energy.

7. An air conditioner for a vehicle, comprising:

a refrigerant cycle in which a refrigerant circulates, the refrigerant cycle including a compressor driven by an engine of the vehicle to compress and discharge the refrigerant, and a cooling heat exchanger configured to cool air to be blown into an interior of the vehicle by exchanging heat with the refrigerant, and a temperature sensor configured to detect a cooling temperature of the air cooled by the cooling heat exchanger; and a controller including at least one processor configured (i) to set a target cooling temperature of the air cooled by the cooling heat exchanger, (ii) to control an operation of the compressor based on the cooling temperature and the target cooling temperature, and (iii) to determine a traveling state of the vehicle, wherein the controller is configured to set a first target temperature as the target cooling temperature when the controller determines that the vehicle is traveling in a condition in which a vehicle traveling speed exceeds 0 and a deceleration traveling is not performed, and to set a second target temperature higher than the first target temperature as the target cooling temperature when the controller determines that the vehicle starts decelerating, the controller is configured to cause the compressor to stop operating when the controller determines that the vehicle starts decelerating, and to cause the compressor to start operating when the cooling temperature detected by the temperature sensor is equal to or higher than the second target temperature, and the controller is configured to cause the compressor to start operating when a predetermined time elapses from the operation stop of the compressor, and to set the predetermined time based on at least one of a traveling time of the vehicle, a rotation speed of the engine, or an outside air temperature.

8. The air conditioner for a vehicle according to claim 7, wherein the controller is configured to cause the compressor to start operating, (i) when the controller determines that the vehicle accelerates during a vehicle decelerating, or (ii) when the controller determines that the vehicle departs while being stopped after decelerating.

9. The air conditioner for a vehicle according to claim 7, wherein the cooling heat exchanger includes a cold storage material configured to store a cold energy.

* * * * *